March 24, 1959     M. P. BAKER     2,879,091

BALL JOINT ASSEMBLY

Filed Feb. 15, 1955

INVENTOR.
MAX P. BAKER

BY

HIS ATTORNEY

United States Patent Office
2,879,091
Patented Mar. 24, 1959

2,879,091
BALL JOINT ASSEMBLY

Max P. Baker, Dayton, Ohio, assignor to General Motors Corporation, Detroit, Mich., a corporation of Delaware Application February 15, 1955, Serial No. 488,187

4 Claims. (Cl. 287—87)

This invention relates to universal joints and in particular to ball and joint assemblies adapted for use in steering mechanisms of automobiles.

Presently known ball joint assemblies generally include a ball stud having a highly finished steel ball, the manufacture of which is relatively expensive. In applications where the ball joint is subject to considerable shock and relatively rough treatment but which requires a smooth operation, various means such as spring arrangements and cushions have been incorporated into the assembly to absorb shock, to hold the ball positioned in the socket and to provide for smooth operation. However, such devices are also relatively costly and, consequently, less desirable ball joints are frequently used in various applications to reduce production costs.

It is an object of this invention to provide a ball and joint assembly wherein the outer portions of the ball of a ball stud is formed of a moldable non-metallic high impact material thus eliminating the need for a more expensive highly finished metal ball.

It is a further object of this invention to provide a ball and joint assembly wherein the ball is formed of a moldable non-metallic high impact material molded directly onto the end of a stud whereby the surface portions of the ball also serve as a bearing material.

A ball joint assembly embodying the aforementioned objectives is relatively simple in structure and eliminates the need for spring cushions and the like for holding the ball positioned in the socket with a desired degree of tightness. Its manufacture is relatively simple and less costly, particularly since the need for forming a highly finished steel ball is eliminated.

Further objects and advantages of the present invention will be apparent from the following description, reference being had to the accompanying drawings wherein preferred embodiments of the present invention are clearly shown.

In general, the present invention consists in forming a ball stud wherein a layer of relatively high impact moldable non-metallic material such as a high impact fiber filled phenolic resin or a suitable nylon composition is molded onto an enlarged end of a stud in the form of a ball which is received by a socket adapted to snugly engage the ball.

Figure 1:
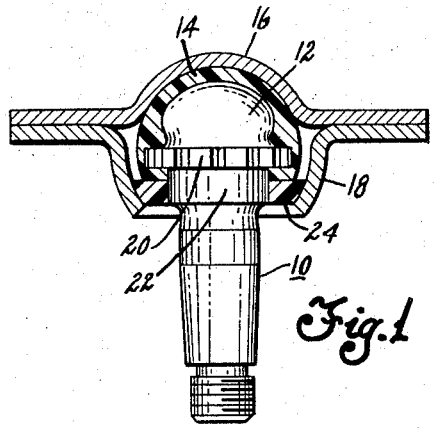
Figure 1 is a cross-sectional side view of a ball and joint assembly constructed in accordance with the present invention.

Referring now to the drawings, Figure 1 shows a preferred form of a ball joint assembly constructed in accordance with the present invention. As is seen, the ball joint assembly has a ball stud which consists of a stud 10 having an enlarged portion 12 on one end thereof over which is molded a relatively high impact moldable non-metallic material 14 in the form of a ball. A socket member, consisting of an upper portion 16 and a lower portion 18 is provided for receiving and holding the ball.

Figure 2:
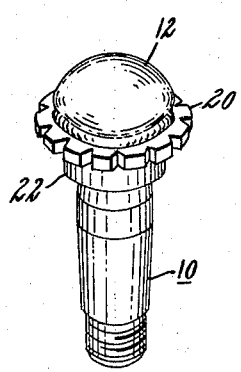
Figure 2 is a stud having an enlarged end portion of irregular form.
Figure 4:
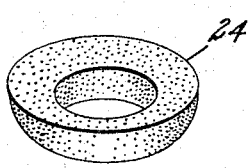
Figure 4 is a seal ring.

Referring to Figure 2, the enlarged end 12 of the stud is shown as being generally mound shaped and having an outwardly projecting peripheral ridge. The end 12 is preferably mound shaped so that the material molded about end 12 in the form of a ball will form an approximately equal layer over the end 12 so as to provide an approximately equivalent bearing surface over the portions of the ball which are disposed in working engagement with upper socket member 16. The notched peripheral ridge 20 provides a means of securely locking the molded portion 14 of the ball about the end 12 of the stud. The enlarged end portion 12 of the stud may be of any suitable shape depending on the use to which the ball joint is put. One of the advantages of the present invention is that it eliminates the use of a relatively expensive stud ball. The enlarged portion 12 may be cast or formed, for example, of commercially available items such as bolts. The peripheral notched ridge 20 as above indicated, operates to lock the molded member 14 to the stud end 12. It is obvious that various arrangements and projecting members or depressions on end 12 which would operate to securely hold molded portion 14 to end portion 12 could be devised. The preferred form shown is designed as indicated to withstand relatively heavy shock.

The preferred form of the invention as shown in Figure 1 is designed for uses wherein the ball bears constantly against upper socket member 16 as, for example, the lower ball joint of a front wheel automobile suspension. Top socket member 16 is formed with a partially spherical concave surface corresponding to the curvature of the ball portion 14. The stud end 12 may be formed with a cylindrical portion 22 which may carry, in slip fit relation, a separately formed annular seal member 24. The lower socket member 18 is in the form of a partially spherical sleeve through which the stud projects. The seal member 24 has peripheral surfaces of partially spherical form corresponding to the internal curvature of inner socket member 18. In operation of the ball joint, the seal member 24 engages internal surfaces of lower socket member 18 to provide a seal for all movements of the ball with respect to the socket. Before assembly of the ball joint members, the ball may be packed with a lubricant. In this connection, the ball surfaces 14 may be provided with lubricant grooves (not shown) to facilitate lubrication of the ball joint. The upper and lower socket members are provided with annular flange portions 19 and 21 which serve to position the socket members with respect to each other and which may be secured to each other as by spot welding.

The embodiment shown in Figure 1 as indicated above, is intended to be loaded with a lubricant and is provided with a seal member 24 to contain the same. In some applications the portion 24 of the base may be formed of a self-lubricating material and lubricant loading of the ball may not be necessary. In constructing a ball and joint assembly of this type, the seal member 24 may be eliminated and lower socket member 24 may be modified to have its internal curvature conform to the shape of the ball.

Figure 3:
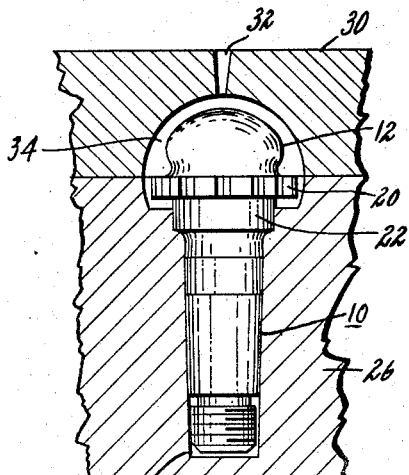
Figure 3 is a stud having an enlarged end portion of irregular form positioned in a mold.

The ball portion 14 of the ball stud may be molded onto stud end 12 in a mold apparatus such as that shown in Figure 3. It consists of a drag or lower portion 26 which has a cavity 28 for positioning the stud and forming the lower portion of the ball. An upper or cope portion 30 has an injection aperture 32 and a cavity 34 for forming the upper portion of the ball.

The moldable non-metallic material referred to throughout this specification may be any relatively tough, high impact material having suitable molding properties. A moldable high impact fiber filled phenolic resin is particularly suitable. Nylon compositions containing various fillers and lubricants such as molybdenum disulfide are also suitable. Other materials which may be mentioned include polytetrafluoroethylene and urea resins. The seal member 24 may be made of suitable seal materials such as nylon or polytetrafluoroethylene, polychloroprene, Buna N, etc.

Other related ball joint assemblies are disclosed in copending applications, S.N. 488,216—Baker, filed February 15, 1955, and S.N. 488,289—Baker, filed February 15, 1955, which are assigned to the assignee of the present invention.

While the embodiments of the present invention as herein disclosed constitute preferred forms, it is to be understood that other forms might be adopted.

What is claimed is as follows:

1. A ball and socket assembly comprising in combination a stud having an enlarged end portion, said enlarged end portion including a raised peripheral ridge disposed on a plane normal to the longitudinal axis of said stud, a moldable, high impact synthetic resin material disposed about said enlarged end and peripheral ridge for fully covering said end and ridge and thereby forming a bearing surface thereover in the form of a ball, and a socket adapted to snugly receive said ball.

2. A ball and socket assembly comprising in combination a stud having an enlarged end portion, said end portion including a raised peripheral ridge disposed on a plane normal to the longitudinal axis of said stud, said stud having a cylindrical portion disposed inwardly and adjacent said enlarged end portion, a high impact fiber filled phenolic resin ball secured about said enlarged end portion and peripheral ridge for fully covering the enlarged end and ridge and thereby forming a bearing surface thereover and an annular seal having spherical outer axial portions disposed about said cylindrical portion of said stud end, a socket for receiving said ball and said seal, said socket having a one end portion of spherical internal contour adapted for snugly engaging said ball and an opposite end of internal spherical contour adapted for sealingly and slidably engaging said spherical portions seal.

3. Claim 1 wherein said high impact synthetic resin is a high impact fiber filled phenolic resin.

4. Claim 1 wherein said high impact synthetic resin comprises nylon.

References Cited in the file of this patent

UNITED STATES PATENTS

| | | |
|---|---|---|
| 2,108,814 | Flumerfelt (1) | Feb. 22, 1938 |
| 2,274,417 | Katcher | Feb. 24, 1942 |
| 2,288,160 | Flumerfelt (2) | June 30, 1942 |
| 2,328,330 | Edington | Aug. 31, 1943 |
| 2,696,818 | Loghem | Dec. 14, 1954 |
| 2,755,116 | Alldredge | July 17, 1956 |